Patented June 23, 1936

2,045,266

UNITED STATES PATENT OFFICE 2,045,266

PRODUCTION OF LIVER EXTRACT

Frederic Fenger, Chicago, Ill., assignor to Armour and Company, Chicago, Ill., a corporation of Illinois No Drawing. Application April 30, 1934, Serial No. 723,175

8 Claims. (Cl. 167—74)

The present invention relates to mammalian extracts, and has particular reference to improvements in the production of extracts, such as liver extract and kidney extract, having physiologically active principles for internal administration in augmentation of natural body production.

It has long been recognized that where the animal system is deficient in some active principle to such an extent as to cause depletion of the physical system, it is possible to restore conditions approaching normal, at least for a limited time subsequent to treatment, by administering a concentrated extract of the deficient physiologically active principle obtained from some other animal. Principally, the extracts are administered orally, but in many cases the extracts are supplied to the animal system hypodermatically.

A principal object of the present invention is to provide an improved process for producing mammalian extracts.

An additional object is the provision of an improved liver extract and process of making the same.

A further object is to provide an improved process for producing liver extract having an unusually high concentration of physiologically active ingredients, an unusually low concentration of physiologically inactive solids, and having a more acceptable taste and odor than extracts of this type known heretofore.

These and other objects will be evident from a consideration of the following description of a preferred embodiment of my invention.

The general process of producing mammalian extracts consists in macerating the body portion from which it is desired to obtain physiologically active constituents and soaking the material to produce an extract which subsequently is concentrated to the desired extent. Solvents, such as alcohol, are employed variously in the production and purification of the extract. Probably the principally used animal extract is liver extract, and it is to the preparation of this material that the present invention is particularly adapted. For this reason the following description will be made with reference to liver extract, although it will be understood that other extracts, such as kidney and tissue extracts, also may be produced to advantage in accordance with my process.

A process for producing liver extracts which has met with considerable favor is described in Patent No. 1,813,788, issued July 7, 1931. According to this patent, liver is macerated and subjected to extraction with an aqueous-alcoholic solution from which is subsequently precipitated by strong alcohol a physiologically active fraction employed for treating secondary anemia.

The constituents of an aqueous or a weak alcoholic extract of liver are extremely complicated and not entirely understood. Included in these constituents are physiologically active principles which vary in their solubilities in alcohol. For example, alcohol solutions of increasing strength will cause the selective precipitation of these physiologically active principles. The active ingredients soluble in alcoholic solutions in 50 to 70 per cent strength are used extensively in the treatment of secondary anemia, while the fraction soluble in alcoholic solutions from 70 to 99 per cent have been used more extensively in the treatment of pernicious anemia.

Along with the physiologically active ingredients of the extract are included many complex proteins and other constituents apparently of a carbohydrate nature. The extracts which have been known heretofore include copious quantities of the physiologically inactive ingredients which increase the total solids content of the extract considerably without adding to its efficacy. In fact, particularly where the extract is to be used intravenously or hypodermatically, the use of liver extract has caused considerable discomfiture in a patient. In the case of certain liver extracts now on the market, there is a total solids content of 30 per cent or more, and only a small portion of this extract consists of physiologically active ingredients. Therefore, it will be seen that a patient is required to consume a relatively large quantity of solids, some of which are detrimental, in order to make up the bodily deficiency in physiologically active ingredients.

The present invention is based upon my discovery that a greatly improved extract can be obtained by producing an aqueous solution of the active ingredients and subjecting this aqueous solution to yeast fermentation in order to convert the carbohydrate constituent of the extract into alcoholic form. Furthermore, the fermented extract is subjected to a digestion process by treatment with an acid-pepsin, thereby eliminating certain undesirable proteins and rendering the extract considerably more desirable from the physiological standpoint. After this treatment the extract can be treated with alcohol to precipitate still further ingredients. By proper control of the amount of alcohol used, it is possible to produce a solution containing the desired physiologically active ingredients with the exclusion of the precipitated materials.

The process is carried out by macerating a quantity of livers freshly removed from the animal and preferably still containing the bodily heat and contacting the macerated tissue with water for a length of time sufficient to extract the desired physiologically active ingredients of the liver. By heating the extract to a temperature of 85° C. the extraction of the active constituents is facilitated and certain heat coagulable proteins are precipitated. Subsequently, the extract is condensed at reduced pressure and at a low temperature, such as 37.5° C., or blood heat, until the solids content of the extract reaches a concentration suitable for yeast fermentation. As will be understood, the optimum solids concentration will vary with the different tissues employed. After being cooled under aseptic conditions, the concentrated extract is inoculated with a pure culture of yeast, and is set aside, well covered and protected from contamination, at a temperature suitable for optimum alcoholic fermentation. In some cases organisms or sugar fermenting enzymes, other than yeast, will be found desirable for converting the carbohydrate constituents of the extract into alcoholic form but in general I have found it preferable to employ yeast fermentation.

When a test with Fehling's solution or other carbohydrate detecting material shows that the sugar present in the extract has been converted into alcohol, the fermentation is stopped and the fermented concentrate is then subjected to a digestion step which causes hydrolysis of the yeast and/or other sugar fermenting organisms and enzymes introduced into the concentrate or formed during the fermentation process. The digestion step also destroys undesirable yeast and/or other metabolates. This digestion step preferably is carried out by adding to the fermented concentrate a mixture of hydrochloric acid and pepsin. Other acids, such as sulphuric, phosphoric, tartaric, etc. may be employed in place of or in addition to hydrochloric acid.

After the digestion has gone to the desired extent, the concentrate is treated with a sufficient quantity of dilute alkali to readjust the hydrogen ion concentration or pH of the concentrate to approximately the pH of the original extract.

Thereafter a sufficient quantity of alcohol is added to the concentrate to bring the alcoholic concentration up to between 80 and 85 per cent. Other well known solvents of the physiologically active constituents of liver may be employed at this point in place of, or in addition to, the alcohol. For instance, ethyl alcohol, or a mixture of ethyl and methyl alcohol may be employed.

The alcoholic treatment causes the precipitation of certain proteins and after proper settling to remove these precipitating inert proteins and other unsoluble constituents the non-alcoholic liquid is poured off or otherwise separated and condensed at a relatively low temperature and under reduced pressure to the desired solids content. Ordinarily, the evaporation will continue until the desired material is in a dry paste, or concentrated liquid form. In any of these forms the liver extract is ready for administration. Where the material is to be used hypodermatically, it may be found desirable to make a still further purification.

As a specific example of the process as described hereinbefore and embodying my invention, the following details of a particular run are given. It will be understood that this example is merely one of many modifications of the process, and that the proportions of materials employed and the manner of treatment will vary in accordance with the particular material used and the result which it is desired to produce.

A quantity of healthy, fresh mammalian livers still containing the animal heat, and weighing approximately 150 pounds, are finely minced and macerated with 50 gallons of water. The mixture is warmed sufficiently to extract the physiologically active constituents and to coagulate certain proteins which otherwise would remain in the solution. The aqueous extract is strained or filtered from the insoluble constituents and the residue is extracted with an additional quantity of water, the two liquid extracts being combined. The combined extracts are evaporated under reduced pressure and at a temperature of approximately 37.5° C. to a solids content of between 25 and 30 per cent.

After cooling the concentrate under aseptic conditions to a temperature approximately 75° F. the concentrate is inoculated with two fluid ounces of freshly prepared, pure and active culture of yeast. The vessel in which the inoculated concentrate is contained is covered over to prevent contamination. Fermentation is allowed to proceed until the concentrate gives a negative test to Fehling's solution. During the fermentation process carbon dioxide is produced and forms a protecting blanket over the top of the concentrate, thereby preventing the oxidation which otherwise is liable to occur.

After the fermentation process has gone to completion, the fermenting extract is subjected to a digestion step in which 25 c. c. of concentrated hydrochloric acid, diluted with 100 c. c. of water, and 10 grams of pepsin are added to the concentrate for each gallon thereof. The concentrate is then maintained at a temperature of approximately 105° F. for two hours, the mixture then being allowed to cool slowly to room temperature. Preferably the cooling extends over night.

Dilute sodium hydroxide solution is added to the digested concentrate until the reaction of the concentrate reaches a hydrogen ion concentration of from 5.0 to 5.5 on the pH scale, this being the normal hydrogen ion concentration of the original, fresh aqueous extract from the mammalian livers. Any suitable alkaline material, such as sodium hydroxide, potassium hydroxide or sodium carbonate, may be employed for this neutralization step.

A sufficient quantity of alcohol is then added to the concentrate to bring the alcoholic concentration to 85 per cent. An alcoholic solution containing 10 parts of methyl alcohol and 100 parts of ethyl alcohol may be used, if desired, since this denatured mixture is considered more economical than pure alcohol.

The mixture then is set aside at a temperature of approximately 40° F., whereupon physiologically inert proteins and other insoluble constituents are precipitated from the extract. This cold alcohol fractionation precipitates other materials, such as phosphates, but leaves the desired physiologically active constituents in solution. A considerably sharper fraction is obtained where the mixture previously has been subjected to yeast fermentation than has been obtained heretofore. The clear supernatant alcoholic solution then is filtered off and evaporated under reduced pressure at a relatively low temperature to a solids content of the desired concentration.

For the yeast fermentation step, it is preferred to maintain the water content of the extract sufficiently high to permit adequate yeast growth. Ordinarily it is preferred to employ an extract having not more than about 10 per cent alcohol, and in most cases an even lower percentage of alcohol is preferred.

Liver extracts known heretofore have a characteristic taste and odor which makes their use for oral administration undesirable. Frequently, the liver odor and taste are so strong as to make the material quite repulsive to the patient. An important feature of my improved process is the discovery that it removes this undesirable taste and odor and leaves a product not at all offensive to the patient. The nature of the reaction by which the taste and odor are removed is not known. The fact remains, however, that some action of the yeast upon the extract changes the odor and taste-imparting ingredients to such an extent as to destroy their normal characteristics, thereby leaving a "sweet" product. As the undesirable odor and taste-imparting constituents of liver extract seem to interfere with the digestive system of the patient, possibly through the nausea caused by their reaction on the sense organs, it will be seen that my process will act in this further manner to increase the efficacy of the final product.

Extensive experimentation indicates that the yeast fermentation removes a substantial quantity of the total solids of the extract, amounting to as high as 40 or 50 per cent in many cases. These removed solids are principally in the nature of sugars having a solubility similar to the solubility of the physiologically active constituents of the extract. Therefore, in the known methods of preparing liver extract, the carbohydrate fraction is not removed in the various steps employed and, the final extract containing the erythropietic principles and/or other physiologically active substances of value, such as vitamins B1 and B2, used in the treatment of nutritional disorders, such as anemia, beriberi, and pellagra, have not been isolated in sufficient purity. The solubility of the carbohydrate fraction is so similar to the solubility of the active constituents that the two classes of materials are carried along together through the various extraction, fractionation and precipitation steps by which other inert or undesirable materials are removed. Consequently, as the concentration of the physiologically active constituents increases, the percentage of contaminated carbohydrates also becomes greater. Particularly in the case of liver extract used for hypodermatic administration, this carbohydrate content is objectionable.

I have found that although the yeast fermentation converts the carbohydrates quantitatively into alcohol, which may be distilled from the extract, the physiologically active ingredients are not deleteriously affected. The sugars normally present in liver extract seem to exert a buffer action which is eliminated by the yeast fermentation. This elimination and the acid-pepsin hydrolysis to which the extract is subjected after the yeast fermentation conditions the extract so that the subsequent alcohol separation of the physiologically active fraction from the inert material becomes sharper and more clear cut.

Aqueous extracts from mammalian tissue contain certain colloidal protein substances of high viscosity which are not precipitated by heat. These colloids are commonly known as "gelatins".

When the aqueous extract of the physiologically active constituents and these colloids are condensed, the latter have a tendency to gelatinize the concentrate, particularly when chilled. This tendency is objectionable, since the alcohol fractionation of the solution is carried out at a low temperature such as 40° F. When the alcohol is added to the solution these gelatinous colloids are precipitated, carrying down with them mechanically, or adsorbed, considerable quantities of the physiologically active substances. Separation of these physiologically active substances from the precipitate by washing with dilute alcohol is practically impossible.

I have found that the acid-pepsin hydrolysis of the concentrate serves to deprive these proteins of their high viscosity and gelatinizing properties to such an extent that they will remain limpid even at ice-box temperatures. Consequently, the alcohol fractionation of the physiologically active constituents becomes sharp and clear cut, a maximum of physiologically active substances remaining in the solution. The small amounts of physiologically active substances which are carried down with the precipitate upon the alcohol fractionation may be recovered by washing with dilute alcohol.

It will be seen that the process is susceptible of regulation to produce the desired type and concentration of active constituents, and in every case there is produced a product which is superior in purity, taste, odor and efficacy to the products known heretofore. In some cases, it will be sufficient to omit the final step of alcohol precipitation and in other cases the acid-pepsin digestion may be dispensed with. However, it is preferred to employ both of these steps, since the resultant product is more desirable for most purposes. In any case the conversion of the carbohydrate fraction of the constituents into alcohol results in a palatable product which extensive use has proven to be superior to the products known heretofore.

It will be understood that the foregoing description is for the purpose of illustration and explanation and that various changes in the procedure outlined are possible. All such changes and modifications are intended to be included in the appended claims.

I claim:

1. The process of preparing a concentrated extract of mammalian tissue which comprises producing an extract of the tissue containing a sufficient quantity of water to permit alcoholic fermentation, subjecting the extract to alcoholic fermentation to remove fermentable carbohydrates therefrom, and concentrating the fermented extract to the desired extent.

2. The process of preparing a concentrated extract of mammalian tissue which comprises producing an extract of the tissue containing a sufficient quantity of water to permit alcoholic fermentation, subjecting the extract to alcoholic fermentation to remove fermentable carbohydrates therefrom, subjecting the fermented extract to a digestive step, and concentrating the extract to the desired extent.

3. The process of producing a concentrated extract of liver which comprises macerating a quantity of liver, subjecting the liver to aqueous extraction, concentrating the resulting extract to a solids content desirable for alcoholic fermentation, inoculating the concentrated extract with yeast, allowing the inoculated extract to ferment, subjecting the fermented extract to digestion with an acid and pepsin, adding to the extract a sufficiently large volume of alcohol to precipitate a portion only of the dissolved substances in said extract, separating the remaining alcoholic solution, and concentrating said solution by evaporation under reduced pressure.

4. The process of producing a concentrated extract of liver which comprises producing an aqueous extract of a quantity of liver, subjecting said extract to yeast fermentation, and concentrating the fermented extract to the desired extent.

5. The process of producing a concentrated extract of liver which comprises producing an aqueous extract of a quantity of liver, concentrating said extract, subjecting the extract to yeast fermentation, subjecting the fermented extract to a digesting step, adding a sufficient quantity of alcohol to the extract to precipitate a portion only of the dissolved substances in the extract, and concentrating said extract to the desired extent.

6. The process of producing a physiologically active extract of liver which comprises producing an aqueous extract of a quantity of liver, converting the carbohydrates in said extract into alcohol, and concentrating the extract to the desired extent.

7. The process of preparing a concentrated mammalian tissue extract which comprises macerating the tissue, subjecting the macerated tissue to extraction with water, applying sufficient heat during the extraction step to cause the active constituents of the tissue to dissolve and to precipitate heat coagulable protein, condensing the extract under vacuum and at a relatively low temperature until the extract has a solids content suitable for yeast fermentation, inoculating the concentrated extract with yeast, subjecting the inoculated extract to alcoholic fermentation to remove fermentable carbohydrates therefrom, subjecting the fermented extract to treatment with hydrochloric acid and pepsin, adjusting the pH of the extract to substantially that of the original extract, adding a sufficient quantity of alcohol to make the alcoholic concentration of the extract between 80 and 85 per cent, settling the extract, removing the clear alcoholic fraction thereof, and concentrating said fraction by evaporation under vacuum.

8. The process of producing a concentrated extract from kidney tissue, which comprises producing an aqueous extract of said tissue, removing water from said extract to produce a concentrate, subjecting said concentrate to alcoholic fermentation to remove carbohydrates therefrom, subjecting the fermented concentrate to a digestive step, and further concentrating the product of said digestion.

FREDERIC FENGER.